United States Patent [19]

Mazoyer

[11] 4,111,432
[45] Sep. 5, 1978

[54] AUTOMATIC DEVICE FOR POSITIONING THE TONE ARM OF A RECORD PLAYER

[75] Inventor: Jean Mazoyer, Nogent-sur-Marne, France

[73] Assignee: Beaulieu, Romorantin, France

[21] Appl. No.: 684,372

[22] Filed: May 7, 1976

[30] Foreign Application Priority Data

May 12, 1975 [FR] France .................................. 75 14704

[51] Int. Cl.² .............................................. G11B 17/06
[52] U.S. Cl. .................................. 274/15 R; 274/1 L; 274/23 R
[58] Field of Search ................. 274/10 R, 15 R, 13 R, 274/14, 23 R

[56] References Cited

U.S. PATENT DOCUMENTS

| 2,989,311 | 6/1961 | Vistain | 274/10 R |
| 3,305,238 | 2/1967 | Carlson | 274/10 R |
| 3,599,984 | 8/1971 | Kondo | 274/1 L |
| 3,697,087 | 10/1972 | Takahashi | 274/10 R |
| 3,701,534 | 10/1972 | Laue | 274/15 R |
| 3,734,512 | 5/1973 | Osborne | 274/23 R |

Primary Examiner—Richard E. Aegerter
Assistant Examiner—John W. Shepperd
Attorney, Agent, or Firm—Brisebois & Kruger

[57] ABSTRACT

Device for driving the tone arm of a high-fidelity record player consists principally of an elongated member fixed to the shaft of said arm and gripped between another elongated member and a spring as said tone arm is moved from its rest position to the beginning of its descent onto the record.

3 Claims, 3 Drawing Figures

AUTOMATIC DEVICE FOR POSITIONING THE TONE ARM OF A RECORD PLAYER

SUMMARY OF THE INVENTION

This invention relates to an automatic device for actuating the tone arm of a record player, and in particular a record player of the high-fidelity type, which device is independent of the motor driving the turntable of said recore player and does not act on the tone arm while the record is being played.

Up to the present most high-fidelity record players have not comprised any device for automatically positioning the tone arm on the record by moving it from its support when in rest position or any means for returning the arm to this support after a record has been played. The principal reason for this is that the devices for driving the arm heretofore generally known have been actuated by the motor which drives the turntable of the record player and have never been truly disconnected during the playing of the record. These devices are, moreover, generally fairly complex, and easily become maladjusted, and do not always make it possible to correctly position the arm on the beginning of a record while avoiding any excessive oscillation of the arm radially of the record because of the inertia of this arm and the abruptness of its movement.

Independent devices for actuating the arm have been known for some time which comprise a motor independent of the one driving the turntable, but these devices, besides being relatively complex, have not made it possible to avoid said excessive oscillations.

It is therefore an object of the present invention to provide a device for actuating the tone arm of a record player which is absolutely independent of the motor driving the turntable of said record player, which is very simple in conception, is almost immune to breakdown, easy to mount on most non-automatic record players, and avoids any excessive oscillation of the arm when it is positioned on the beginning of the disc, and which has no influence on the arm from the time at which it makes its first contact with the disc until after the record has been played.

In accordance with the present invention such an actuating means is characterized by the fact that the arm is fixed to an elongated member which is firmly spring-biased, during the movement of the arm from its rest support to the beginning of its descent onto the record, against another elongated member. The spring is driven by a cam device, and the cam is itself driven by a motor independent of the one driving the turntable of the record player, the stop position of the other elongated member is dependent upon the different diameters of the records used and determined by means of one or more stops, which may be fixed or retractable, and are positioned at appropriate location and controlled by an appropriate system, for example, a cam or electromagnetic system, in dependence upon the diameter of the recore selected. The pressure exerted by the spring on the first elongated member ceases only when the other elongated member is immobilized against one of the stops.

In a preferred embodiment of the invention at least a substantial part of the components of the device according to the present invention is fixed to a plate elastically suspended from the frame of the record player.

In accordance with another embodiment of the invention the device for positioning the tone arm is started up after the playing of a record by a detecting device having several detectors corresponding to different diameters of the records used, and preferably fixed to said device for determining the stopping position of the other elongated member.

The invention will be better understood from the following detailed description of a preferred embodiment of the invention, which is given purely by way of illustration and example, with reference to the accompanying drawings, in which.

Figure 1:
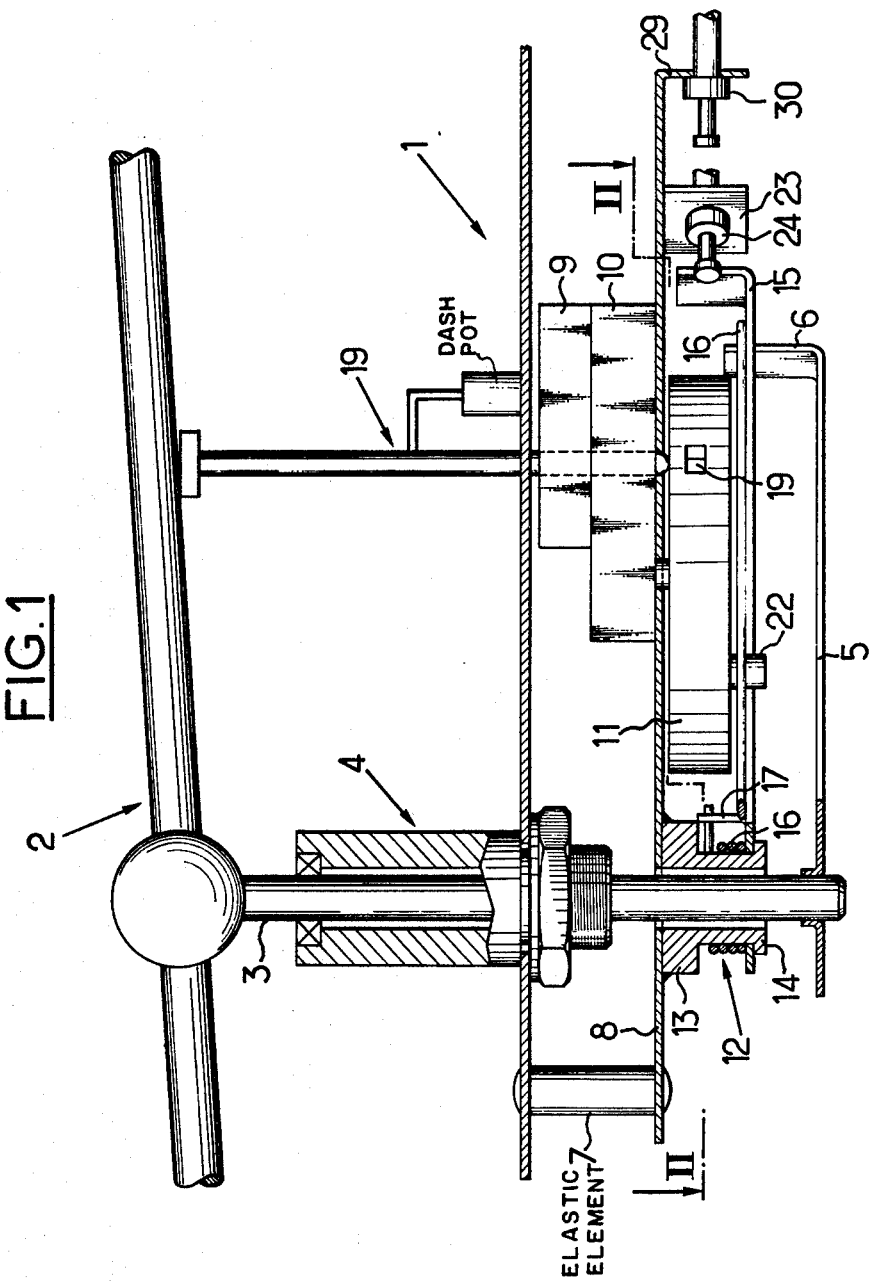
FIG. 1 is a schematic partial sectional view taken along the line I—I of FIG. 2, through the device according to the invention.

The drawings show only part of a plate 1 suspended in an appropriate manner from the frame of a record player (not shown). A tone arm 2 is mounted on this plate and carries a pickup head (not shown). The shaft 3 of the arm 2 is mounted in a conventional manner in a guide tube 4 (not shown in detail) and fixed to the plate 1. The relative angular positions of the arm 2 and its shaft 3 may be regulated (in planes parallel to the frame 1) by means of a conventional device not shown in the drawings. On the lower part of the shaft 3 is an elongated member 5, the end 6 of which remote from the shaft 3 is bent upward.

Beneath the table 1 and parallel to it is a supporting plate 8 attached to the plate 1 by appropriate spacer bars 7 and adapted to support most of the mechanical components and part of the electrical components of the device according to the invention.

On the upper part of the plate 8 is an auxiliary motor 9 provided with suitable reduction gearing 10 driving a cam wheel 11 beneath the plate 8, and which will be hereinafter described in greater detail.

On the lower surface of the plate 8 is a sleeve 12 through which the shaft 3 passes freely, that is to say without any contact. This sleeve 12 has a shoulder 13 by means of which it is mounted on the plate 8 and an elongated member 15 practically parallel to the plate 5 is mounted on a flange 14 at the lower end of said sleeve. This member can turn about the sleeve.

The flange 14 also carries, between the shoulder 13 and the member 15, a spring 16 made of steel wire wound around the sleeve 12, one end of the spring which bears against a projection 17 on the member 15, while its other end bears on the bent end 6 of the member 5, the spring being so positioned as to exert a force on the bent end 6 in the direction of the member 15 so as to hold it firmly against said member 15.

The upper part of the cam wheel 11 carries near its periphery a ramp 18 of the bell ramp type cooperating with an arm lifting device 19, not shown in detail on the drawing, which may advantageously be of the dash-pot type.

The cam disc 11 has a notch in an appropriate part of its lateral surface which cooperates with two switches 20 and 21 respectively, as will be hereinafter explained.

The bottom of the cam disc 11 carries in an appropriate position a projection 22 cooperating with the elongated member 15 and the spring 16, as will be hereinafter explained.

The plate 8 carries on a tab 23, bent downwardly and perpendicular to its principal surface, a sleeve 24 which receives a retractable stop 25 controlled, through a flexible wire 26 leading to another mounting means 27 provided with a sleeve and positioned at an appropriate point on the frame 1 of the turntable, by a cam 28 having two positions marked "AUTO" and "MANUAL" respectively. The position of the cam shown on the drawing is the retracted position marked "AUTO." The location of the stop 25 is such that, when the cam 28 is in "MANUAL" position, rotation of the member 15 is prevented and the tone arm 2 may be actuated by hand to place it in any desired position on a record to be played.

Figure 2:
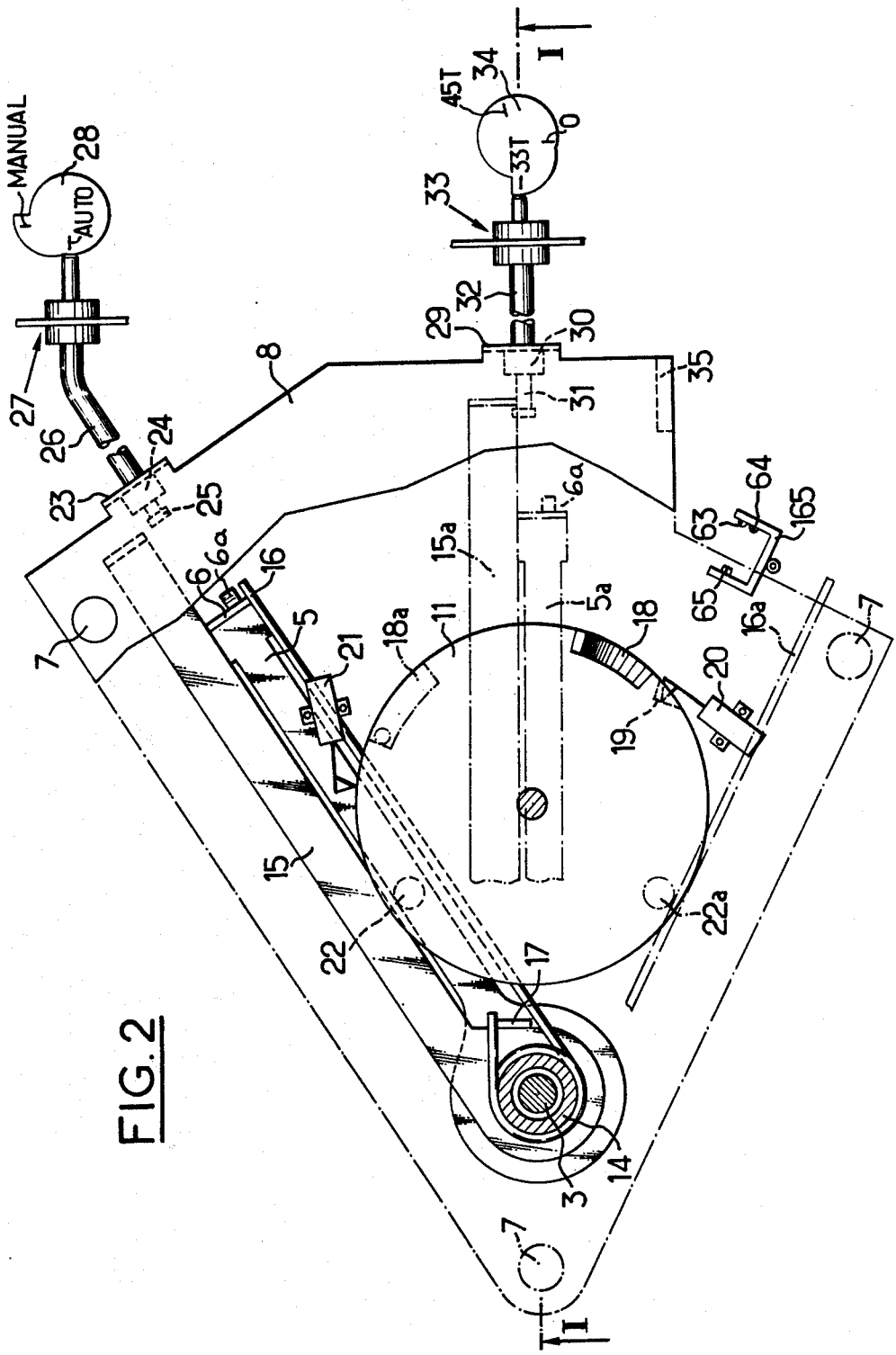
FIG. 2 is a plan view, partially in section, taken along the line II—II of FIG. 1.

FIG. 2 has been shown in such a manner than when the tone arm moves from its rest position to its playing position the assembly comprising the members 5 and 15 and the spring 16 moves clockwise.

The supporting plate 8 also comprises another tab 29 bent perpendicularly and downwardly with respect to the principal surface of said plate. This tab 29 also carries a sleeve 30 through which passes another retractable stop 31 controlled by a flexible wire 32 leading to another sleeve type mounting device 33 attached to the frame 1. This flexible member is controlled by another cam 34 having three positions —33T, 0 and 45T, the position shown on the drawing being 33T. When the cam 34 is at the position 33T, the stop 31 is in its extended position and stops the elongated member 15 rotating in a clockwise direction. This plate takes the position shown in broken lines on FIG. 2 and indicated 15a, which corresponds to the position at which the arm 2 must stop in order to fall correctly at the beginning of a record adapted to turn at 33⅓ rpm having a standard diameter of 30 centimeters.

The supporting plate 8 also comprises a tab 35 serving as a fixed stop for the movable member 15, said tab being also bent downwardly perpendicular to the principal surface of the plate 8 and positioned at a location so determined as to stop clockwise rotation of the tone arm 2 in a position corresponding to the starting position for records 17 centimeters in diameter which rotate at 45 rpm. When the cam 34 is in position 45T, the stop 31 is in retracted position so as to permit the member 15 to pass freely.

The projection 22 has a length such that it can drive both the spring 16 and the member 15.

Figure 3:
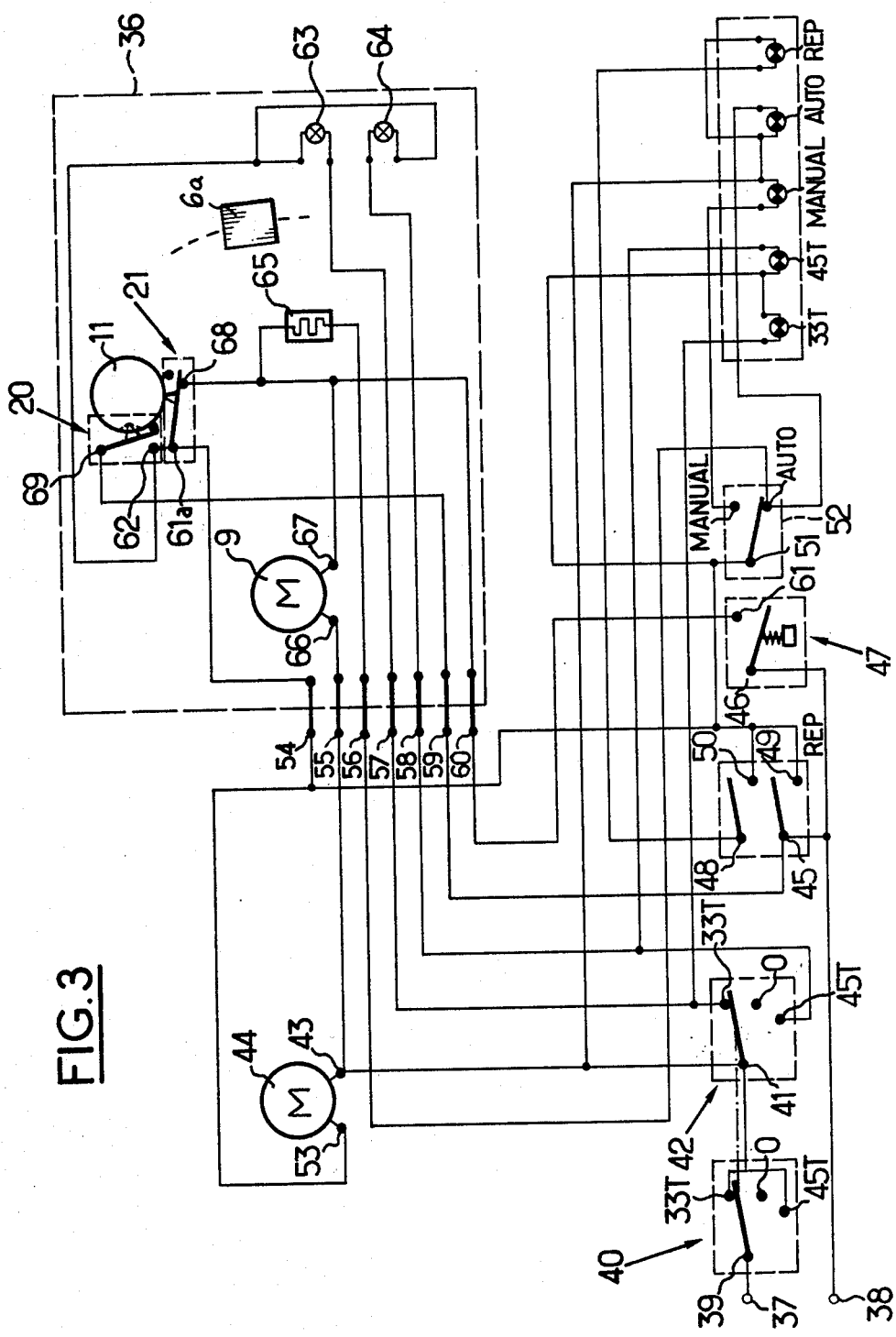
FIG. 3 is a circuit diagram of a device according to the present invention.

On the circuit diagram of FIG. 3 a rectangle 36 is shown in broken lines and represents the components fixed to the plate 1 and/or the supporting plate 8, all the other components of FIG. 3 outside the rectangle 36 being fastened to a frame which cannot transmit vibrations to the suspended part of the record player.

The supply voltage for the device arrives through the input terminals 37 and 38. The terminal 37 is connected to the movable contact 39 of a main switch 40 having three stationary contacts respectively marked 33T, 0 and 45T. The stationary contact of the switch 40 corresponding to the 0 position is floating, while the two other fixed contacts of said switch are connected together and to the movable contact 41 of a switch 42 having three stationary contacts marked respectively 33T, 45T and 0, the axis of switch 42 being locked with those of the switch 40 and the cam 34. The movable contact 41 of the switch 42 is connected to the supply terminal 43 of the drive motor 44 of the record player. This movable contact 41 is also connected to a first supply terminal of each of three indicators respectively marked "MANUAL," "AUTO" and "REP."

The input terminal 38 is directly connected to one of the movable contacts 45 of the switch "REP" having two positions and two circuits as well as to the movable contact 46 of the pushbutton 47.

The stationary contact 33T of the switch 42 is connected to the first supply terminal of the luminous indicator 33T, the second supply terminal of which is connected to the first supply terminal of another luminous signal 45T, the second terminal of which is connected to the stationary contact 45T of the switch 42.

The second movable contact 48 of the switch "REP" is connected to the second supply terminal of the indicator "REP." The two stationary contacts 49 and 50 of the switch "REP" correspond respectively to the movable contacts 45 and 48 and are connected together and to the movable contact 51 of the switch 52 having two stationary contacts, one marked "MANUAL" and the other "AUTO."

The movable contact 51 is connected to the common supply point for the two indicators 33T and 45T. The switch 52 is fixed to the cam 28.

The two stationary contacts 49 and 50 of the switch "REP" are also connected to a second supply terminal 53 of the motor 44 as well as to an input terminal 54 of the electrical device shown inside the rectangle 36. The six other input terminals of this device represented inside the rectangle 36 carry reference numerals 55 to 60.

The input terminal 55 is connected to the supply terminal 43 of the motor 44. The input terminal 56 is connected to the stationary contact marked "AUTO" of the switch 52, which is itself connected to the second supply terminal of the indicator also marked "AUTO." The input terminal 57 is connected to the stationary contact 33T of the switch 42. The input terminal 58 is connected to the stationary contact 45T of the switch 42. The input terminal 59 is connected to the movable contact 45 of the switch "REP." Finally, the input terminal 60 is connected to the stationary contact 61 of the pushbutton 47.

The connections to the various components inside the rectangle 36 will now be described.

The input terminal 54 is connected to the movable contact 61a of the switch 21 as well as to the stationary contact 62 of the switch 20 and to the first supply terminal of each of two lamps 63 and 64, respectively, which cooperate with a photoelectric cell 65 mounted on leg of a U-shaped support 165 the other leg of which supports lamps 63 and 64, in order to produce the return of the arm 2 to its rest position at the end of the playing of records which are 30 and 17 centimeters in diameter respectively, since, in general, the end of the playing of these records does not take place in the same angular position of the tone arm and it is necessary to slightly space the devices for detecting the end of the playing of these records. This is why, in the embodiment of the present invention, the lamps cooperating with the photoelectric cells and arranged in a conventional manner, have been spaced from each other. The illumination of the cell results in the return of the arm 2 to its original position followed by stopping of the motor 44.

The input terminal 55 is connected to the supply terminal 66 of the motor 9, the other supply terminal 67 of which is connected on the one hand to the input terminal 60 and on the other hand to the stationary contact 68 of the switch 21, as well as to one of the terminals of the cell 65 the other terminal of which is directly connected to the input terminal 56.

The input terminal 57 is connected to the second supply terminal of the lamp 63 while the input terminal 58 is directly connected to the second supply terminal of the lamp 64.

Finally, the input terminal 59 is connected to the movable contact 69 of the switch 20.

THe switch 20 is so connected that when its actuating pin extends into the notch 19 in the cam wheel 11 its movable contact 69 moves away from the stationary contact 62 and the switch 21 is so connected that when its actuating pin engages in the notch 19 its movable contact 61 moves away from its stationary contact 68.

The operation of the automatic device illustrated on the accompanying drawings will now be described:

In the rest position of the apparatus, that is to say, when the tone arm 2 rests on its rest position support, the elongated members 15 and 5 as well as the spring 16 are in the position shown in solid lines in FIG. 2. The disc of cam 11 is also in the position shown in FIG. 2 and the actuating pin of switch 20 is engaged in the notch 19. The projection 22 of the cam 11 is between the spring 16 and the member 15 and rests lightly on the edge of the member 15.

Let it be supposed that the cam 28 is in "AUTO" position, the cam 34 is in position 33T, and the switch 40 is closed. The switches 42 and 52 are in the positions shown on FIG. 3. It is also supposed that the switch "REP" is in the position shown in FIG. 3 and neither of the motors 9 and 44 is supplied.

To start the apparatus the pushbutton 47 is pressed so that its movable contact 46 comes in contact with its stationary contact 61. At this moment indicators 33T and Auto and lamp 63 light up the motor 9 is supplied and the cam 11 begins to turn (in a counter-clockwise direction as seen in FIG. 2) so that the movable contact 69 of the switch 20 quickly comes into contact with its stationary contact 62 and, once this contact has been established, the pressure on the pushbutton 47 may be released. As soon as the pushbutton 47 has been pressed, the motor 44 is supplied and drives the turntable. As soon as the switch 20 is released from the notch 19 a durable contact is established between the contacts 69 and 62 of the switch 20.

When the cam 11 begins to turn as indicated above, the projection 22 leaves the member 15 and comes into contact with the spring 16 which it drives, and this spring begins to turn clockwise driving with it the member 15 as well as the member 5 the end 6 of which is gripped between the spring 16 and the member 15. The rotation of the member 5 drives the tone arm 2, which is in its upper position, the lifting arm 19 not being in contact with the ramp of the cam 18. This rotation of the assembly of members 16, 15, 5, 3 and 2, driven by the projection 22 of the cam 11 continues until the member 15 encounters the stop 31, which is in its extended position. At this moment the members 5 and 15 stop turning and assume without any excessive oscillation the positions respectively indicated by 5a and 15a on FIG. 2, while the cam disc 11 continues to turn and its projection 22 continues to drive the spring 16, the tension on which increases in proportion to the extent of rotation of its major straight part, which heretofore drove the end 6 of the member 5.

The rotation of the cam 11 continues until the notch 19 actuates the switch 21, the movable contact of which assumes the opposite position to the one shown in FIG. 3 thus cutting off the supply to the auxiliary motor 9 and stopping the rotation of the cam 11, the projection 22 of which assumes the position 22a shown on FIG. 2, said major straight part of the spring 16 assuming the position 16a also shown on FIG. 2. By this time the ramp of the cam 18 has arrived at 18a beneath the lifting arm 19, which descends while permitting the tone arm 2, to fall and assume a position at the beginning of the record to be played. The long straight part of the spring 16 being then in position 16a, the member 5, which is fixed to the arm 2, may turn freely in a clockwise direction and thus no strain is exerted by the automatic mechanism on the tone arm.

When the record has been played, the light rays emitted by the lamp 63 corresponding to the record which has been played, strike, by means of e.g., a mirror 6a, fixed on the end 6 of the member 5, the cell 65, which becomes conductive and re-establishes the supply to the motor 9 which drives (always in a counter-clockwise direction on FIG. 2) the cam 11. Once the cam 11 begins to turn, the notch 19 moves away from the switch 21 which returns to the position shown on FIG. 3 and re-establishes the supply to the motor 9 Photocell 65 is provided with the usual shield or hood to prevent its direct illumination by light from lamps 63 or 64, but becomes illuminated when mirror 6a reaches a position to reflect light from one of the lamps onto the photocell.

Once the cam 11 begins to turn the ramp of cam 18 progressively lifts the lifting arm 19 which in its turn lifts the tone arm 22, thus lifting its pick-up head from the record.

Simultaneously, the projection 22 of the cam 11 and the spring 16 return toward the members 5 and 15. Once this spring enters into contact with the tab 6 of the member 5 it is firmly applied against the member 15, and since the cam 11 continues to rotate, its projection 22 pushes the member 15 which then turns in a counter-clockwise direction so as to return to the position shown in solid lines on FIG. 2, and at this moment the notch 18 actuates the switch 20 which returns to the position shown in FIG. 3, which cuts off the supply to the auxiliary motor 9, and the motor 44 and the cam 11 stops turning. The tone arm then stops on its rest position support.

In an analagous manner, if the cam 34 were in the position 45T, the assembly of members 5, 15 and 16 would turn conjointly until the member 15 came into abutment against the fixed stop 35 and the tone arm would position itself correctly on a record 17 centimeters in diameter turning at 45 rpm.

In order to play records of another diameter, for example 25 centimeters, or if it is desired to manually position the tone arm on the record the cam 28 is placed in manual position. The stop 25 is then in its extended position, and the indicator "MANUAL" lights up. When pressure is exerted on the pushbutton 47, the cam 11 begins to turn as already described, driving the spring 16 to its position 16a, the member 15 being blocked by the stop 25. Once the notch 19 actuates the switch 21 (breaking the circuit), rotation of the cam 11 stops, the spring 16 being in position 16a of FIG. 2, and the user may manually position the tone arm at the starting point of a record to be played or at any position on this record, the member 5 being released from the spring 16. It should be noted that, as may be seen on the circuit diagram of FIG. 3, when the switch 52, fixed to the cam 28, is in manual position the cell 65 is out of the circuit and there is no automatic stopping at the end of the playing of the disc. To cause this stopping it is possible to proceed in either of two ways:

One may first, for example, position the switch 40 in position 0, but it is preferable, when it is desired to stop playing the record, to press on the pushbutton 47 which restarts the cam 11 in rotation and this initiates the second phase of the process described up to the stopping of the motor by the opening of the switch 20.

It is, however, possible to provide, in manual position, automatic stopping at the end of the playing of the record, it being supposed that the end of the disc being played corresponds to that of a 33 rpm or a 45 rpm record, and this by a simple modification of the connections which is not described in this text but is obvious to a man skilled in the art. It is also possible to provide a third retractable abutment positioned between the stops 31 and 35 which is also controlled by the cam if one expects to play a large number of records having a diameter between 17 and 30 centimeters, for example 25 centimeters. One may then use, for example, the lamp 63 corresponding to 30 centimeter records turning at 33 rpm or even a third lamp (not shown) the connections to which would be equally obvious to a man skilled in the art.

It is even possible to provide a retractable stop for discs having a diameter greater than 30 centimeters if the mechanical construction of the arm and the record player permit it.

The switch "REP" is adapted to replay the same disc one or more times when it is caused to take a position opposite from the one shown in FIG. 3, that is to say when the movable contacts 45 and 48 come respectively into contact with the stationary contacts 49 and 50. When this switch is closed, it short-circuits the switch 20 and the disc may be replayed without stopping so long as the switch "REP" is closed.

It is obvious that the flexible control means may be replaced, together with the cams of the movable abutments 25 and 31, by any other known device serving the same purpose and also connected to the switches 52 and 42 respectively.

It is also obvious that the notch 19 may be replaced by any other device which may cooperate with the stopping systems, for example photoelectric devices or proximity detectors, and that the cell 65 may be replaced, together with the lamps 63 and 64, by any other stopping device of a conventional type serving the same purpose. Similarly, the arm lifting device, which is disconnectable in the manual position, may also be controlled by any other known device fixed to the cam 11.

The cam 11 may also rotate in a direction opposite to the one described, need not necessarily be circular, and may be even replaced by any other mechanical device of a conventional type serving the same purposes, for example, a rack.

What is claimed is:

1. In a device for positioning the tone arm of a record player having a turntable and a motor connected to drive said turntable, said device comprising a second motor independent of the one driving said turntable, a tone arm, a rotatable shaft on which said tone arm is mounted, a vertically movable rod for lifting said tone arm, a first elongated member freely rotatable about said shaft, record diameter selecting means, retractable stop means controlled by said selecting means and adapted to stop said first elongated member in a selected position corresponding to the diameter of a particular record to be played, fixed stop means adapted to stop said first elongated member in a position corresponding to the diameter of the smallest record the player is adapted to accommodate, a second elongated member fixed to said tone arm shaft, spring means urging both elongated members together, and a photoelectric stopping device, the improvement which comprises a cam wheel driven by said second motor and two switches in the supply line to said motor for stopping said motor with said cam wheel in either of two stopping positions, the first of which corresponds to the rest position of the tone arm, said cam wheel comprising:

a ramp on its upper part positioned to actuate said lifting rod to regulate the height of said tone arm, a notch on its lateral surface cooperating with said two switches and, a projection on its bottom positioned to drive said spring means and said first elongated member as said cam moves between said cam wheel stopping positions until said first elongated member encounters a selected one of said stop means, whereupon further rotation of said spring means relieves the pressure by said spring means urging said elongated members together, said photoelectric stopping device being positioned to be energized by said second elongated member when said record has been played and cause said cam wheel to drive said spring until both elongated members are again urged together, whereupon said projection drives said first elongated member until the cam wheel reaches its first stop position.

2. Device as claimed in claim 1, in which said photocell trip device comprises a single photoelectric cell and a plurality of lamps, one for each stop means, each positioned to illuminate said photoelectric cell when the tone arm reaches the end of the sound track of a record having a given diameter, said illumination being controlled by means fixed on said second elongated member.

3. Device as claimed in claim 1, comprising a second retractable stop means adapted to stop rotation of said first elongated member and to allow hand actuation of said tone arm to place it in any desired position on a record to be played.

* * * * *